US008626054B2

(12) United States Patent
Burstein et al.

(10) Patent No.: US 8,626,054 B2
(45) Date of Patent: *Jan. 7, 2014

(54) AUTOMATED ANNOTATION (75) Inventors: Jill Burstein, Princeton, NJ (US);
Daniel Marcu, Hermosa Beach, CA (US)

(73) Assignee: Educational Testing Service, Princeton, NJ (US)

( * ) Notice: Subject to any disclaimer, the term of this patent is extended or adjusted under 35 U.S.C. 154(b) by 172 days.

This patent is subject to a terminal disclaimer.

(21) Appl. No.: 12/839,818

(22) Filed: Jul. 20, 2010

(65) Prior Publication Data

US 2010/0285434 A1 Nov. 11, 2010

Related U.S. Application Data

(63) Continuation of application No. 11/465,896, filed on Aug. 21, 2006, now Pat. No. 7,796,937, which is a continuation of application No. 10/176,534, filed on Jun. 24, 2002, now Pat. No. 7,127,208, which is a continuation-in-part of application No. 10/052,380, filed on Jan. 23, 2002, now Pat. No. 6,796,800.

(51) Int. Cl.
*G09B 7/00* (2006.01)

(52) U.S. Cl.
USPC .......................................................... 434/353

(58) Field of Classification Search
USPC .......................................................... 434/353
See application file for complete search history.

(56) References Cited

U.S. PATENT DOCUMENTS

| | | |
|---|---|---|
| 4,958,284 A | 9/1990 | Bishop et al. |
| 4,978,305 A | 12/1990 | Kraft |
| 5,437,554 A | 8/1995 | Clark et al. |
| 5,458,493 A | 10/1995 | Clark et al. |
| 5,466,159 A | 11/1995 | Clark et al. |
| 5,558,521 A | 9/1996 | Clark et al. |
| 5,672,060 A | 9/1997 | Poor |
| 5,690,497 A | 11/1997 | Clark et al. |
| 5,709,551 A | 1/1998 | Clark et al. |
| 5,716,213 A | 2/1998 | Clark et al. |
| 5,718,591 A | 2/1998 | Clark et al. |
| 5,735,694 A | 4/1998 | Clark et al. |
| 5,752,836 A | 5/1998 | Clark et al. |
| 5,827,070 A | 10/1998 | Kershaw et al. |

(Continued)

FOREIGN PATENT DOCUMENTS

| | | |
|---|---|---|
| GB | 2388699 A | 11/2003 |
| JP | 04-090055 | 3/1992 |

(Continued)

OTHER PUBLICATIONS

Marcu; The Rhetorical Parsing of Natural Language Texts; Proceedings of the 35th Annual Meeting of the Assoc. for Computational Linguistics; pp. 96-103; 1997.

(Continued)

*Primary Examiner* — Kathleen Mosser
(74) *Attorney, Agent, or Firm* — Jones Day (57) ABSTRACT

To automatically annotate an essay, a sentence of the essay is identified and a feature associated with the sentence is determined. In addition, a probability of the sentence being a discourse element is determined by mapping the feature to a model. The model having been generated by a machine learning application based on at least one annotated essay. Furthermore, the essay is annotated based on the probability.

48 Claims, 8 Drawing Sheets

(56) References Cited

U.S. PATENT DOCUMENTS

| | | | |
|---|---|---|---|
| 5,878,386 | A | 3/1999 | Coughlin |
| 5,987,302 | A | 11/1999 | Driscoll et al. |
| 6,115,683 | A | 9/2000 | Burstein et al. |
| 6,155,839 | A | 12/2000 | Clark et al. |
| 6,159,018 | A | 12/2000 | Clark et al. |
| 6,168,440 | B1 | 1/2001 | Clark et al. |
| 6,181,909 | B1 | 1/2001 | Burstein et al. |
| 6,183,260 | B1 | 2/2001 | Clark et al. |
| 6,183,261 | B1 | 2/2001 | Clark et al. |
| 6,193,521 | B1 | 2/2001 | Clark et al. |
| 6,267,601 | B1 | 7/2001 | Jongsma et al. |
| 6,332,143 | B1 | 12/2001 | Chase |
| 6,356,864 | B1 | 3/2002 | Foltz et al. |
| 6,366,759 | B1 | 4/2002 | Burstein et al. |
| 6,461,166 | B1 | 10/2002 | Berman |
| 6,558,166 | B1 | 5/2003 | Clark et al. |
| 6,796,800 | B2 | 9/2004 | Burstein et al. |
| 7,088,949 | B2 | 8/2006 | Burstein et al. |
| 7,127,208 | B2 | 10/2006 | Burstein et al. |
| 2002/0083104 | A1 | 6/2002 | Polanyi et al. |
| 2003/0031996 | A1 | 2/2003 | Robinson |
| 2003/0149692 | A1 | 8/2003 | Mitchell |
| 2005/0042592 | A1 | 2/2005 | Burstein et al. |
| 2007/0077542 | A1 | 4/2007 | Burstein et al. |

FOREIGN PATENT DOCUMENTS

| | | |
|---|---|---|
| JP | 06-231178 | 8/1994 |
| JP | 07-182373 | 7/1995 |
| JP | 09-016630 | 1/1997 |
| JP | 09-016631 | 1/1997 |
| JP | 2000-029894 | 1/2000 |
| WO | WO 02/059857 A1 | 8/2002 |
| WO | WO 2004/001700 A1 | 12/2003 |
| WO | WO 2004/003689 A2 | 1/2004 |
| WO | WO 2004-061593 A2 | 7/2004 |

OTHER PUBLICATIONS

Mann et al.; Rhetorical Structure Theory: Toward a Functional Theory of Text Organization; Text 8(3); pp. 243-281; 1988.

Daume et al.; The Importance of Lexicalized Syntax Models for Natural Language Generation Tasks; Proc. of the 2nd Int'l Conference on Natural Language Generation; 2002.

Carlson et al.; An Empirical Study of the Relation Between Abstracts, Extracts and the Discourse Structure of Texts; Proc. of the Document Understanding Conference (DUC-2001); New Orleans, LA; Sep. 13-14; 2001.

Marcu; The Theory and Practice of Discourse Parsing and Summarization; MIT Press; 2000 (TOC).

Harada et al.; Automatic Eraction of the Subject Bearing Sentences; School of Library and Information Science; Keio University, Tokyo; pp. 17-26 (w/ English Abstract); 1993.

Shermis et al.; Trait Ratings for Automated Essay Grading; Indiana University, Purdue University, Indianapolis; Apr. 21, 1999.

Page et al.; Computer Analysis of Student Essays: Finding Trait Differences in Student Profile; Ann. Mtg. of the American Educational Research Assoc.; Chicago, IL; Mar. 1997.

Shermis et al.; Trait Ratings for Automated Essay Grading; Educational and Psychological Measurement; vol. 62; pp. 5-18; 2002.

Chodorow et al.; An Unsupervised Method for Detecting Grammatical Errors; pp. 140-147; 2000.

Salton; Automatic Text Processing: The Transformation, Analysis, and Retrieval of Information by Computer; Addison-Wesley Series in Computer Science; Table of Contents; 1989.

Burstein et al.; Automated Essay Scoring for Non Native English Speakers; pp. 68-75; 1999.

Burstein; The E-rater Scoring Engine: Automated Essay Scoring With Natural Language Processing; Automated Essay Scoring; Ch. 7; pp. 113-121; 2003.

Elliot; IntelliMetric: From Here to Validity; Automated Essay Scoring; Ch. 5; pp. 71-86; 2003.

Landauer et al.; Automated Scoring and Annotation of Essays with the Intelligent Essay Assessor; Automated Scoring of Essay Content; Ch. 6; pp. 87-112; 2003.

Page; Project Essay Grade: PEG; Project Essay Grade (PEG); Ch. 3; pp. 43-54; 2003.

Quirk, Randolph, et al.; A Comprehensive Grammar of the English Language; Longman Group Limited; 1985; Table of Contents.

Larkey, Leah S.; Automated Essay Grading Using Text Categorization Techniques; Center for Intelligent Information Retrieval; Amherst, MA; pp. 90-95; 1998.

Krippendorff, Klaus; Conent Analysis: An Introduction to Its Methodology; vol. 5, The SAGE CommText Series; 1980; Table of Contents.

Shermis et al.; Validity of Automated Essay Scoring Systems; Automated Essay Scoring: A Cross-Disciplinary Perspective; pp. 147-167; 2003.

Burstein et al.; Finding the Write Stuff: Automatic Identification of Discourse Structure in Student Essays; Natural Language Processing; IEEE Computer Society; p. 32-39; 2003.

Burstein et al.; Directions in Automated Essay Analysis; The Oxford Handbook of Applied Linguistics; Ch. 37; pp. 487-497; 2002.

Burstein et al.; Automated Scoring Using a Hybrid Feature Identification Technique; Ann. Mtg of the Assoc. of Computational Linguistics; Montreal, Canada; 1998.

Regression Modeling; http://www.kellogg.nwu.edu/faculty/weber/emp/Modeling.htm.; 2002.

Linear Models (Statistics Toolbox): Stepwise Regression Diagnostics Table; http://www.mathworks.com/access/helpdesk/help/toolbox/stats/linear19.shtml.; 2002.

Linear Models (Statistics Toolbox): Stepwise Regression; http://www.mathworks.com/access/helpdesk/help/toolbox/stats/linear16.shtml.; 2002.

Burstein et al.; Towards Automatic Classification of Discourse Elements in Essays; Ann. Mtg on Assoc. for Computational Linguistics; Toulouse, France; pp. 98-105; 2001.

Ishioka, Tsunenori; Computerized Automated Essay Scoring System E-rater; University Entrance Exam Forum, National University Entrance Examinations, No. 24; pp. 71-76; 2001.

AUTOMATED ANNOTATION

RELATED APPLICATIONS

The present application is a continuation of U.S. patent application Ser. No. 11/465,896, filed Aug. 21, 2006 now U.S. Pat. No. 7,796,937, entitled "Automated Annotation." The '896 application is a continuation of U.S. patent application Ser. No. 10/176,534, filed Jun. 24, 2002 now U.S. Pat. No. 7,127,208, entitled "Automated Annotation," which is a continuation in part of U.S. patent application Ser. No. 10/052,380, filed Jan. 23, 2002, now U.S. Pat. No. 6,796,800 entitled "Methods For Automated Essay Analysis." All of these are hereby incorporated into the present application by reference.

BACKGROUND

Practical writing experience is generally regarded as an effective method of developing writing skills. In this regard, literature pertaining to the teaching of writing suggests that conception of subject matter, arrangement and revision in essay writing may be improved through practice of essay writing. Furthermore, evaluation and feedback, specifically pointing out strong and weak areas in a students essay writing, may facilitate improvements in the student's writing abilities, specifically with regard to essay organization.

In traditional writing classes, students may be presented with a "revision checklist". The revision checklist is intended to facilitate a process (i.e., the revision process) in which the student is asked to critically review their own work and identify areas needing improvement. Typically, this checklist is a list of questions posed to the student. These questions are intended to help the student reflect on the quality of their writing. For instance, the checklist might pose questions such as the following: a) Is the intention of the thesis statement clear?; b) Does the thesis statement respond directly to the essay question?; c) Are the main points in the essay clearly stated?; and d) Does the conclusion relate to the thesis statement? If these questions are expressed in such general terms, they may be of little help.

Instead, it may be most helpful if "discourse elements" within a student's essay are identified and presented to the student. Specific examples of discourse elements include: title, background, thesis statement, main points, support, conclusion, and the like. When the identified discourse elements are presented to the student, the student may, more easily, be able to determine if, for instance, the conclusion follows, conceptually, the thesis statement. However, a teacher may not have sufficient time to annotate (e.g., identify and mark-up the discourse elements of an essay) each student essay and point out specific weaknesses or deficiencies. Furthermore, not all teachers have the same level of annotation skills and thus, some students may receive insufficient or improper annotation. Therefore, an automated discourse analysis application may be valuable to those who wish to improve their writing skills with regard to organization of ideas.

SUMMARY

In accordance with an embodiment, the invention pertains to a method for automatically annotating an essay. In this method, a sentence of the essay is identified and a feature associated with the sentence is determined. In addition, a probability of the sentence being a discourse element is determined by mapping the feature to a model. The model having been generated by a machine learning application based on at least one annotated essay. Furthermore, the essay is annotated based on the probability.

BRIEF DESCRIPTION OF THE DRAWINGS

Embodiments of the invention are illustrated by way of example and not limitation in the accompanying figures in which like numeral references refer to like elements, and wherein.

DETAILED DESCRIPTION

For simplicity and illustrative purposes, the principles of the invention are described by referring mainly to an embodiment thereof. In the following description, numerous specific details are set forth in order to provide a thorough understanding of the invention. It will be apparent however, to one of ordinary skill in the art, that the invention may be practiced without limitation to these specific details. In other instances, well known methods and structures have not been described in detail so as not to unnecessarily obscure the invention.

Figure 1:
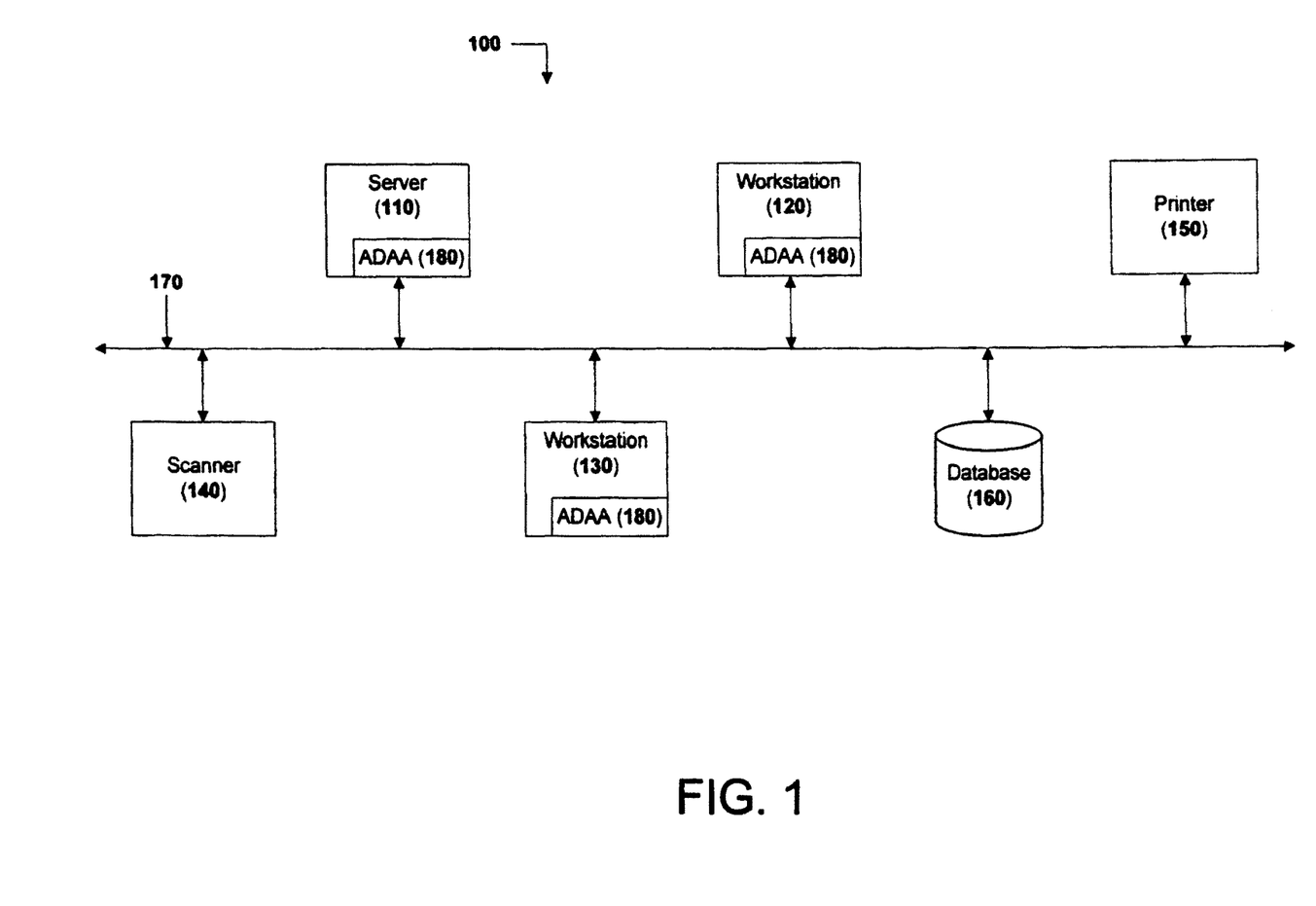
FIG. 1 is a block diagram of a computer network in which an embodiment of the invention may be implemented.

FIG. 1 is a block diagram of a computer network 100 in which an embodiment of the invention may be implemented. As shown in FIG. 1, the computer network 100 includes, for example, a server 110, workstations 120, and 130, a scanner 140, a printer 150, a database 160, and a network 170. The computer network 170 is configured to provide a communication path for each device of the computer network 100 to communicate with the other devices. Additionally, the computer network 170 may be the Internet, a public switched telephone network, a local area network, private wide area network, wireless network, and the like.

In various embodiments of the invention, an automated discourse analysis application ("ADAA") 180 may be executed on the server 110 and/or either or both of the workstations 120 and 130. For example, in an embodiment of the invention, the server 110 is configured to execute the ADAA 180, provide output for display to the workstations 120 and/or 130, and receive input from the workstations 120 and/or 130. In various other embodiments, one or both of the workstations 120 and 130 may be configured to execute the ADAA 180 individually or co-operatively.

The scanner 140 may be configured to scan textual content and output the content in a computer readable format. Additionally, the printer 150 may be configured to output the content to a print media, such as paper. Furthermore, data associated with: at least one essay; textual content; annotated essay; and the like, may be stored on the database 160. The database 160 may additionally be configured to receive and/ or forward some or all of the stored data. Moreover, in yet another embodiment, some or all of the computer network 100 may be subsumed within a single device.

Although FIG. 1 depicts computer network, it is to be understood that the invention is not limited to operation within a computer network, but rather, the invention may be practiced in any suitable electronic device. Accordingly, the computer network depicted in FIG. 1 is for illustrative purposes only and thus is not meant to limit the invention in any respect.

Figure 2:
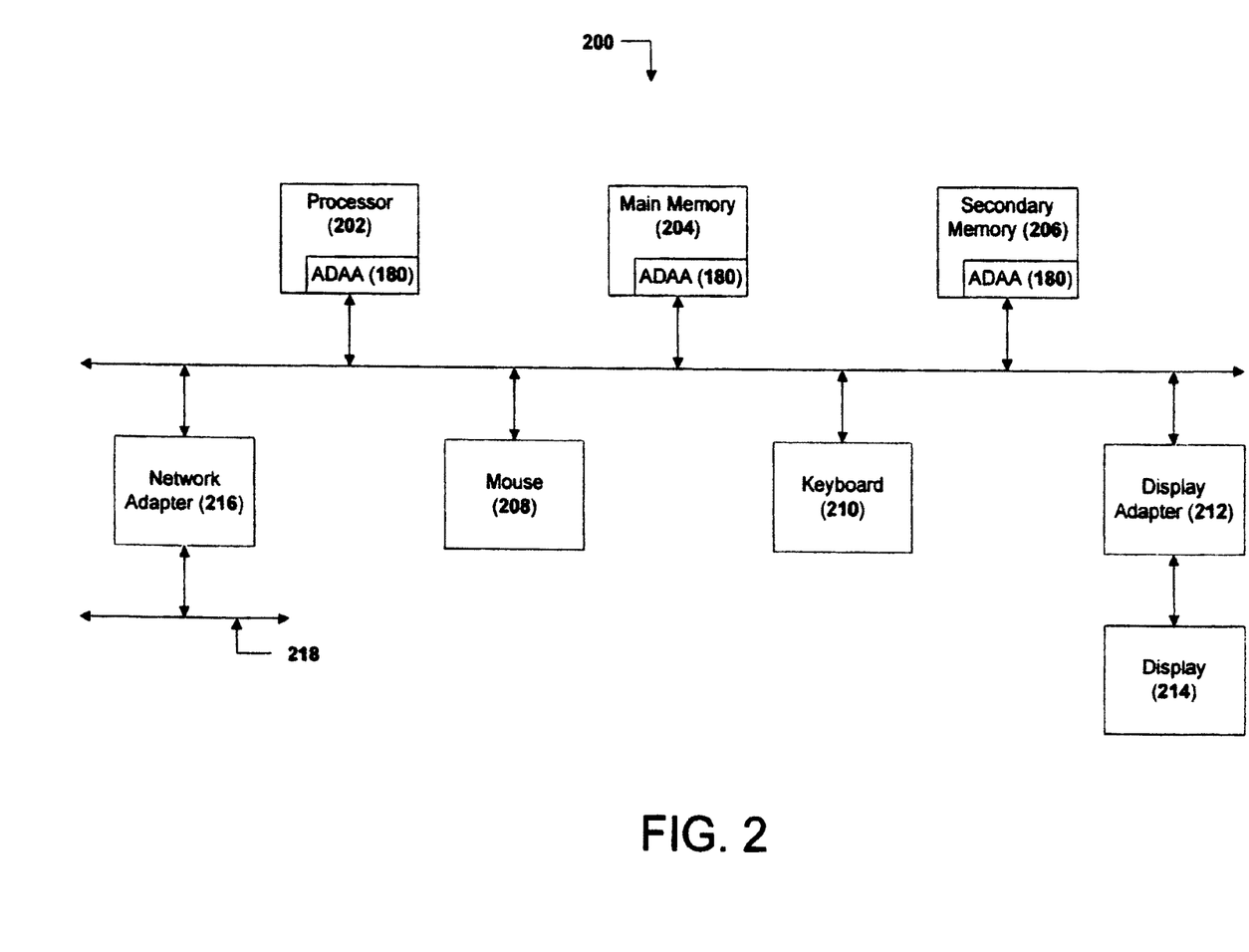
FIG. 2 is a block diagram of a computer system in which an embodiment of the invention may be implemented.

FIG. 2 is a block diagram of a computer system 200 in which an embodiment of the invention may be implemented. As shown in FIG. 2, the computer system 200 includes a processor 202, a main memory 204, a secondary memory 206, a mouse 208, a keyboard 210, a display adapter 212, a display 214, a network adapter 216, and a bus 218. The bus 218 is configured to provide a communication path for each element of the computer system 200 to communicate with the other elements.

The processor 202 is configured to execute a software embodiment of the ADAA 180. In this regard, a copy of computer executable code for the ADAA 180 may be loaded in the main memory 204 for execution by the processor 202 from the secondary memory 206. In addition to computer executable code, the main memory 204 and/or the secondary memory may store data, including essays, textual content, annotated essays, tables of data, and the like.

In operation, based on the computer executable code for an embodiment of the ADAA 180, the processor 202 may generate display data. This display data may be received by the display adapter 212 and converted into display commands configured to control the display 214. Furthermore, in a well known manner, the mouse 208 and keyboard 210 may be utilized by a user to interface with the computer system 200.

The network adapter 216 is configured to provide two way communication between the network 170 and the computer system 200. In this regard, the ADAA 180 and/or data associated with the ADAA 180 may be stored on the computer network 100 and accessed by the computer system 200.

Figure 3:
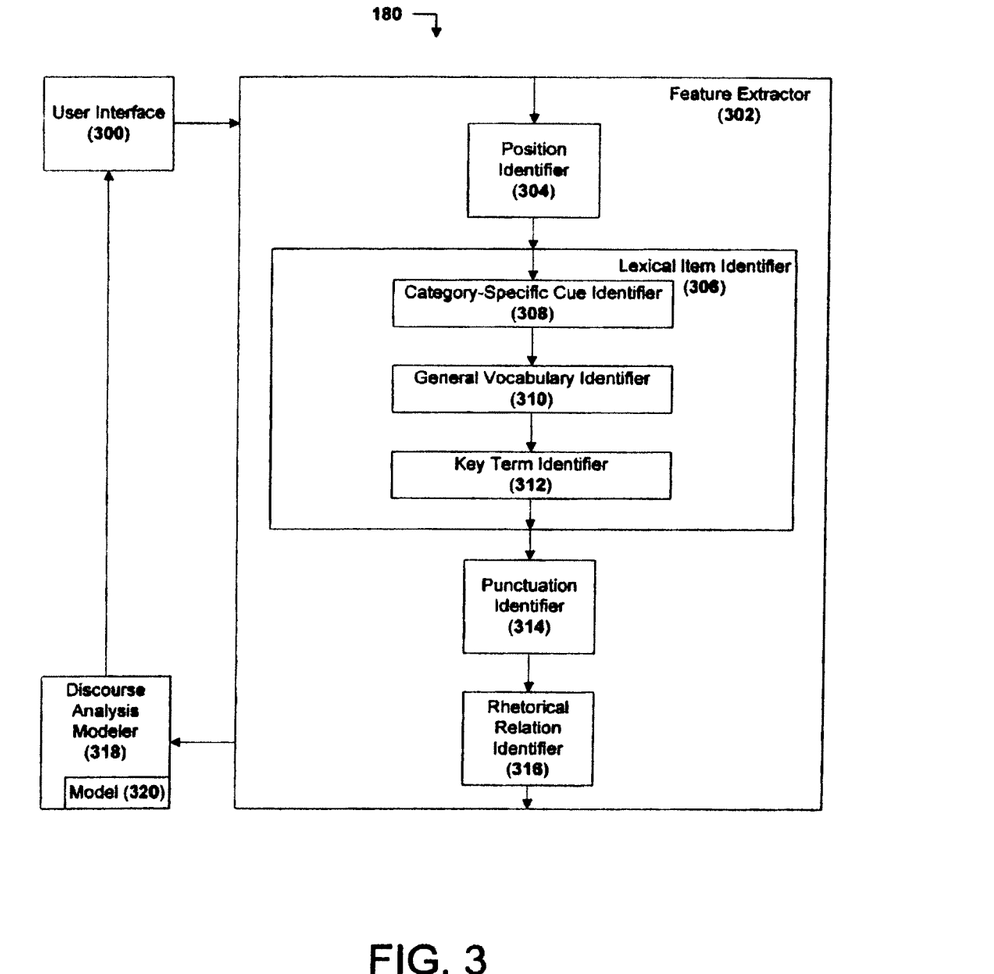
FIG. 3 is a block diagram of an architecture for an embodiment of an automated discourse analysis application.

FIG. 3 is a block diagram of an architecture for an embodiment of the ADAA 180. As shown in FIG. 3, the ADAA 180 includes a user interface 300 configured to accept an essay and/or to output an annotated essay to the user. For example, the user interface 300 may accept an essay keyed into the keyboard 210 and display an annotated essay on the display 214. The user interface 300 is further configured to forward the essay to a feature extractor 302 and receive the annotated essay from a discourse analysis modeler 318.

The feature extractor 302 includes a position identifier 304, a lexical item identifier 306, a punctuation identifier 314, and a rhetorical relation identifier 316, each of which is configured to inter-communicate. The term "feature" may be defined as an attribute, characteristic, and/or quality associated with an identified sentence. More specifically, a feature may include a lexical feature (e.g., word, phrase, etc.) and/or punctuation within the identified sentence. In this regard, the position identifier 304 is configured to identify sentences and paragraphs within the essay and generate a "flat" file including a sentence entry for each identified sentence. For each identified sentence, an absolute and relative position may be determined and stored to the corresponding sentence entry (entry) in the flat file. In addition a variety of features may be included in the entry and these features may be set, by default, to "F" for false. In this regard, each entry may include a string of features separated by commas, for example. As will be described in greater detail hereinbelow, as particular features are identified, these default settings may be modified to "T" for true. An example of a flat file for an essay including 18 identified sentences, 3 identified paragraphs and approximately 40 lexical features is shown in the following Table 1:

TABLE 1

TEXT, 1, 18, 1, 3, Frst, F, F, T, F, T, F, F, F, F, F, F, F, T, F, F, T,
F, F, F, F, F, F, F, F, F, F, F, F, F, F, F, F, F, T, T, F, F, F, F
TEXT, 2, 18, 1, 3, Bd, F, F, F, F, T, F, F, F, F, F, F, F, T, F, F, F,
F, F, F, F, F, F, F, F, F, F, F, F, F, F, F, F, F, T, F, F, F, F, F
TEXT, 3, 18, 1, 3, Bd, F, F, F, F, T, F, T, F, T, F, F, F, T, T, F, F,
F, F, F, F, F, T, F, F, F, F, T, F, T, F, F, F, F, F, T, F, F, F, F, F
TEXT, 18, 18, 3, 3, Lst, F, F, F, T, F, F, F, F, F, F, F, F, T, F, F, F,
F, F, T, F, F, F, F, F, F, F, T, F, T, F, F, F, F, F, T, T, F, F, F, F, F As shown in table 1, the example of a flat file includes 18 entries, one for each identified sentence. Each entry begins with a first feature, the term "TEXT" to indicate a text segment (e.g., a sentence, phrase, etc.) is being identified. The next four features are positional features. These positional features, respectively from left to right, are as follows: sentence position; total number of sentences (utilized to determine relative sentence position); paragraph position; and total number of paragraphs (utilized to determine relative paragraph position). The sixth feature is utilized to indicate whether the sentence is a first sentence, a body sentence, or a last sentence, respectively within the essay. The remainder of the features are utilized to indicate the presence (T) or absence (F) of pre-determined lexical and/or punctuation features. In the example of a flat file provided in table 1, approximately 46 features are identified. However, in practice, any reasonable number of features may be identified. For example, in another embodiment of the invention, approximately 100 features are identified for each identified sentence.

The position identifier 304 is further configured to determine a relative position for each identified sentence within the essay and/or within a paragraph. As the relative position is determined, this value may be stored to the appropriate entry in the flat file. For example, in the flat file for an 18 sentence essay described in table 1, a total number of identified sentences is determined and this value is stored within each entry. In addition, a total number of paragraphs and an associated paragraph number may be stored within each entry. The position identifier 304 is further configured to forward the flat file to the lexical item identifier 306.

The lexical item identifier 306 is configured to identify lexical features and modify the flat file accordingly. Basically, the lexical item identifier is configured to parse each identified sentence for the presence of a pre-defined lexical feature and, if found, modify the corresponding entry in the flat file. These lexical features may also be described as "cues" (e.g., indicators, guides, etc.) due to their association with discourse elements and/or rhetorical structures. In general, cues may include words, terms, phrases, syntactic structures, and the like. As shown in FIG. 3, the lexical item identifier 306 includes a category-specific cue identifier 308, a general vocabulary identifier 310, and a key term identifier 312.

The category-specific cue identifier 308 is configured to identify cues typically associated with particular discourse elements. In this manner, a cue may be utilized to indicate a particular sentence is a particular discourse element. For example, the phrase, "in conclusion" is typically associated with the conclusion statement. Other examples include words such as, "opinion" and "feel" being generally associated with the thesis statement.

In an embodiment of the invention, the category-specific cue identifier 308 may parse through each sentence of the essay searching for a plurality of pre-determined cues. The category-specific cue identifier 308 is further configured to modify the appropriate entry in the flat file in response to identifying a cue. Moreover, the category-specific cue identifier 308 is configured to forward the flat file to the general vocabulary identifier 310.

The general vocabulary identifier 310 is configured to identify features that may be associated with discourse structures. A discourse structure is a term used to describe an elementary discourse unit, such as a thought or statement. In general, a discourse structure may include a word, term or syntactic structure. More particularly, a discourse structure is typically made up of a sentence or phrase.

The features identified by the general vocabulary identifier 310 have been predetermined to be associated with specific discourse marker words and terms. For example, the words, "agree" and "disagree" may be associated with identification of an argument. In another example, words such as, "this" and "these" may indicate that the topic being discussed has not changed. The general vocabulary identifier 310 is further configured to modify the appropriate entry within the flat file in response to identifying a pre-determined feature. Furthermore, the general vocabulary identifier 310 is configured to forward the flat file to the key term identifier 312.

The key term identifier 312 is configured to parse each sentence for pre-determined cues associated with various discourse relationships. For example, the words, "first", "second", "third", and "finally" may be associated with parallel discourse relationships. In another example, words such as, "however" and "alternatively" may be associated with a contrasting discourse relationship. The key term identifier 312 is further configured to modify the appropriate entry within the flat file in response to identifying a pre-determined feature. Furthermore, the key term identifier 312 is configured to forward the flat file to the punctuation identifier 314.

The punctuation identifier 314, is configured to identify punctuation pre-determined to be associated with particular discourse elements. For example, an exclamation point at the end of a sentence may indicate a relatively low probability that the sentence is a thesis or conclusion statement and a relatively high probability that the sentence is a supporting sentence. In addition, the punctuation identifier 314 is further configured to modify the appropriate entry within the flat file in response to identifying a pre-determined punctuation. Furthermore, the punctuation identifier 312 is configured to forward the flat file to the rhetorical relation identifier 316.

The rhetorical relation identifier 316 is configured to receive the flat file and generate a rhetorical structure tree ("RST") (See FIG. 5) based on the essay and/or the flat file. A rhetorical relation is a term used to describe how two or more rhetorical structures are connected (e.g., related). In this regard, a text segment (e.g., phrase, sentence, etc.) may have a rhetorical relation to other text segments in an essay. In a general example, a statement may contrast another statement, a paragraph may elaborate on a sentence, and the like. In a more specific example, a text segment beginning with the word, "but" may be said to contrast a preceding text segment. A more detailed description on the topic of rhetorical relation may be found in U.S. Pat. No. 6,366,759 B1 and is hereby incorporated in its entirety. Rhetorical features identified by the rhetorical relation identifier 316 may be stored to the flat file (e.g., utilized to modify corresponding entries in the flat file, etc.). The rhetorical relation identifier 316 is further configured to forward the flat file to the discourse analysis modeler 318.

Figure 6:
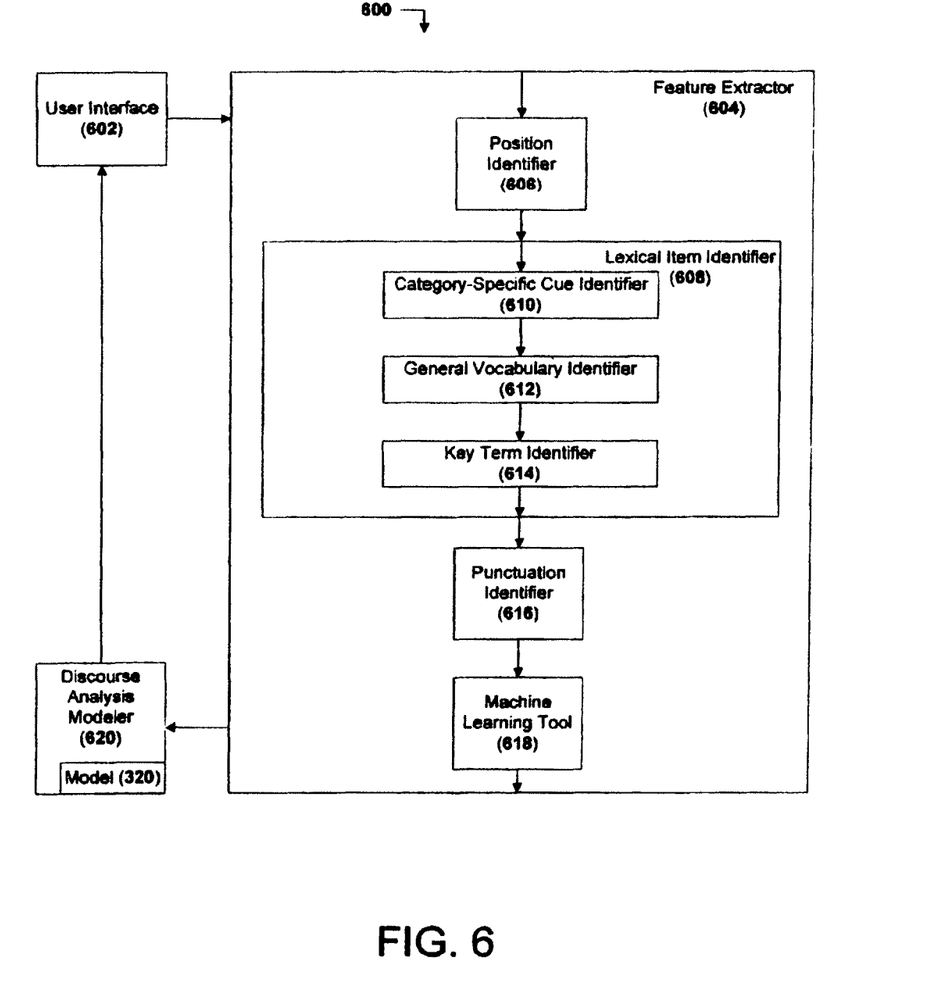
FIG. 6 is a block diagram of an architecture for an embodiment of an automated discourse analysis model builder application.
Figure 7:
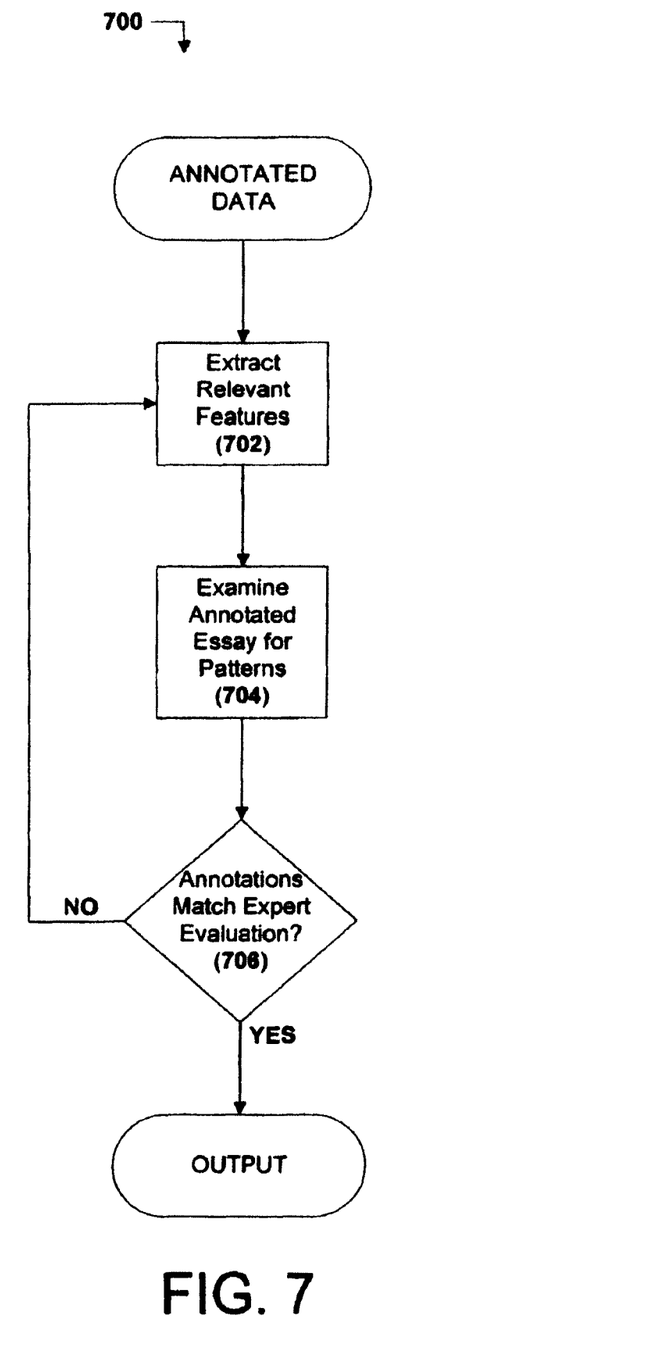
FIG. 7 is a flow diagram of a method for building a discourse analysis model according to an embodiment of the invention.

The discourse analysis modeler 318 is configured to receive the flat file from the feature extractor 302 and extract patterns from the flat file, based on previous training (See FIG. 7). In the previous training, a model 320 is generated (See FIG. 6). In general, the model 320 includes at least one decision tree generated based on essays annotated by experts and/or trained judges. By navigating the decision tree based on the presence or absence of features associated with each entry in the flat file, a probability correlating each identified sentence to a discourse element may be determined. Thus, for each sentence, the model 320 is utilized to determine the likelihood of the sentence belonging to a discourse classification category. To those skilled in the art, this process is described as "mapping". For example, as the flat file is "mapped" (e.g., overlaid, compared, etc.) to the model 320, the probability of each identified sentence being the thesis statement is determined. These probabilities are compared and, the sentence with a relatively higher probability is determined to be the thesis statement. Furthermore, in this manner, the discourse analysis modeler 318 may utilize the model 320 to assign (e.g., categorize) each identified sentence as being (or not being) a member of a particular discourse element.

In another embodiment, the discourse analysis modeler 318 is configured to utilize a voting algorithm to classify sentences in discourse element categories. In general, although not shown in FIG. 3, the voting algorithm may utilize decisions from a plurality of substantially independent discourse analysis systems (e.g., discourse models, models, etc.). (See FIG. 6). For example, the model 320 may include a model generated based positional data, a model generated based on lexical features, and a model generated based on punctuation. Thus, the flat file may be mapped to each of the plurality of models generating a plurality of probabilities. These probabilities may be utilized, based on a level of agreement between the models, to categorize each sentence.

The discourse analysis modeler 318 is further configured to annotate the essay based on the determined probabilities. This annotated essay may then be forward by the discourse analysis modeler 318 to the user interface 300.

With reference to FIG. 1, in another embodiment, the ADAA 180 may be configured to intercommunicate with a database such as the database 160. In this regard, the ADAA 180 may be configured to execute autonomously and/or provide the user with the capability to select data from the database 160 for analysis.

Figure 4:
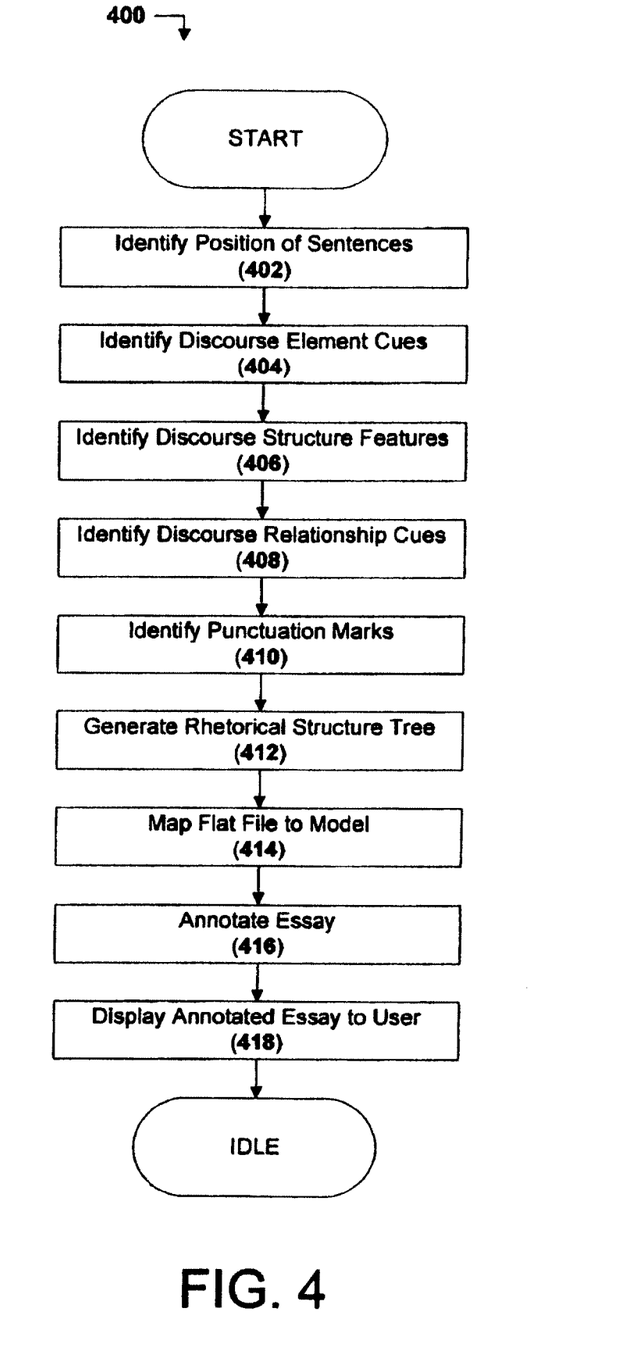
FIG. 4 is a flow diagram of a method of discourse analysis according to an embodiment of the invention.

FIG. 4 is a flow diagram of a method 400 for the ADAA 180 according to an embodiment of the invention. Accordingly, the method 400 may be implemented on a computer system (e.g., the computer system 200) and/or over a computer network (e.g., the computer network 100). The method 400 is initiated in response to receiving an essay.

At step 402, sentences of the essay may be identified by the position identifier 304. Furthermore, a flat file including a sentence entry for each identified sentence may be generated by the position identifier 304. Each sentence entry may include a string of features separated by commas. Positional features may be assigned a numerical value and the lexical features may be set, by default, to "F" for false. As will be described in greater detail hereinbelow, as particular lexical features are identified, these default settings may be modified to "T" for true.

At steps 404-408, lexical features are identified and corresponding entries for identified sentences within the flat file are modified accordingly by the lexical item identifier 306.

At step 404, cues typically associated with particular discourse elements are identified by the category-specific cue identifier 308. In addition, entries in the flat file corresponding to sentences having identified cues may be modified. For example, if the second identified sentence is determined to include the pre-defined search term "opinion", then lexical feature corresponding to the term "opinion" may be modified from "F" to "T" in the second entry.

At step 406, features associated with discourse structures may be identified by the general vocabulary identifier 310. In addition, entries in the flat file corresponding to sentences having identified features may be modified. For example, if the third identified sentence is determined to include the pre-defined search term "those", then lexical feature corresponding to the term "those" may be modified from "F" to "T" in the third entry.

At step 408, pre-determined cues associated with various discourse relationships may be identified by the key term identifier 312. In addition, entries in the flat file corresponding to sentences having identified cues may be modified. For example, if the fourth identified sentence is determined to include the pre-defined search term "never the less", then lexical feature corresponding to the term "never the less" may be modified from "F" to "T" in the fourth entry.

At step 410, pre-determined punctuation marks may be identified by the punctuation identifier 314. In addition, entries in the flat file corresponding to sentences having identified punctuation may be modified. For example, if the fifth identified sentence is determined to include the pre-defined punctuation "?", then feature corresponding to the punctuation "?" may be modified from "F" to "T" in the fifth entry.

At step 412, an RST is generated based on the flat file by the rhetorical relation identifier 316. In addition, based on the RST, rhetorical features are identified and corresponding entries for identified sentences within the flat file are modified accordingly by the rhetorical relation identifier 316.

At step 414, the flat file may be mapped to the model 320. In general, the likelihood of each identified sentence being a particular discourse element is determined. These probabilities are compared and, the sentence with a relatively higher probability for the particular discourse element is determined to be that particular discourse element. Furthermore, in a similar manner, the probable discourse element category for a plurality of identified sentences may be determined by the discourse analysis modeler 318.

Additionally or in another embodiment of the invention, a voting algorithm may be utilized to classify sentences into discourse element categories by the discourse analysis modeler 318. In this regard, the decisions from a plurality of substantially independent discourse analysis systems may be weighed (e.g., compared, etc.) to determine a discourse element category probability for each identified sentence.

At step 416, the essay may be annotated based on the determined probabilities by the discourse analysis modeler 318. This annotated essay may then be forward by the discourse analysis modeler 318 to the user interface 300.

At step 418, the annotated essay may be displayed to the user via the display 214 by the user interface 300. Following step 418, the method 400 may end or the method 400 may idle until further user commands and/or essay are received.

Figure 5:
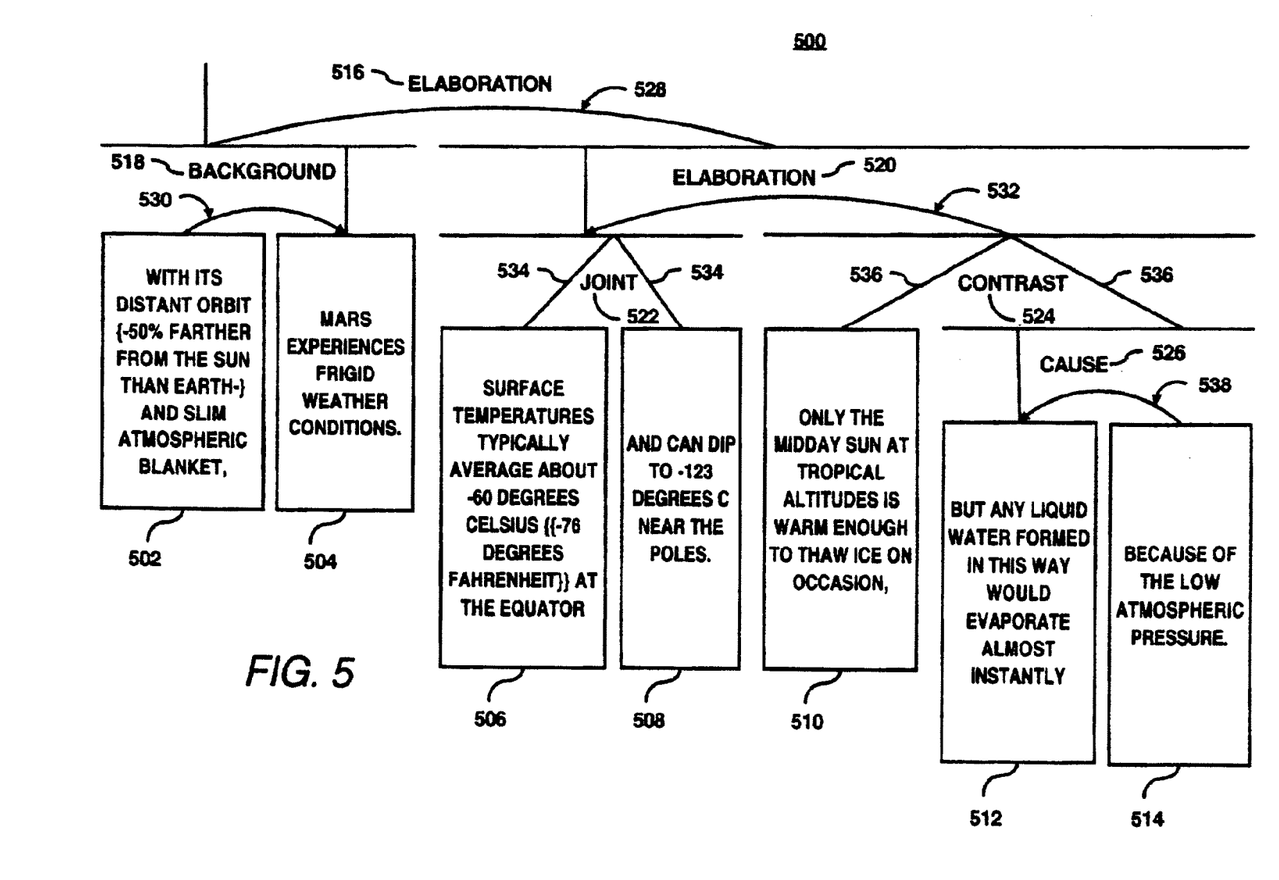
FIG. 5 is a diagram of a rhetorical structure tree according to an embodiment of the invention.

FIG. 5 is a diagram of a rhetorical structure tree ("RST") 500 according to an embodiment of the invention. As shown in FIG. 5, the RST 500 includes discourse structures 502-514 and rhetorical relations 516-526. In the RST 500, each discourse structure 502-514 is identified as having a rhetorical relation 516-526 to another discourse structure 502-514. For example, the discourse structure 506 has the rhetorical relation 522 to the discourse structure 508. In the example described, the rhetorical relation 518 is a "joint" relation. This may be determined based on the conjunction "and" which is used to "join" the discourse structure 508 to the discourse structure 506. Other examples of rhetorical relations include: elaboration, background, contrast, cause, antithesis, interpretation, etc.

Additionally, each of the rhetorical relations 516-526 includes an associated node 528-538 (e.g., connection). Each node 528-538 may be characterized by a "status" (nucleus or satellite). The distinction between nuclei and satellites comes from the empirical observation that, in general, a nucleus is utilized to express more important content relative to a satellite. Furthermore, a nucleus of a rhetorical relation is typically comprehensible independent of the satellite, but not vice versa. Moreover, these discourse structures and rhetorical relations may be utilized as features and thus, may be stored to the flat file.

In the above-included example, the RST 500 was automatically generated based on an essay utilizing a cue-phrase-based discourse parser (not shown) of Dr. Daniel Marcu ("The theory and practice of discourse parsing and summarization" The MIT press, 2000) and is hereby incorporated by reference in its entirety. However, in response to a different essay, the cue-phrase-based discourse parser, may generate a different RST. Accordingly, the above described RST 500 is provided by way of an example only. Therefore, the invention is not limited to the cue-phrase-based discourse parser or the RST 500, but rather, various embodiments of the invention may include any reasonable method of identifying and categorizing sentences, and thus, are within the scope of the invention.

In the following FIG. 6, training data is utilized to build a discourse analysis model, such as the model 320. In an embodiment of the invention, this training data may include essays and the like. In this regard, the training data may be similar to the essay data described hereinabove.

FIG. 6 is a block diagram of an architecture for an embodiment of a discourse analysis model builder ("model builder") 600. While not shown in FIGS. 1 and 2, the model builder 600 may be implemented on a computer system (e.g., the computer system 200) and/or over a computer network (e.g., the computer network 100). As shown in FIG. 6, the model builder 600 includes a user interface 602, a feature extractor 604, and a machine learning tool 618.

The user interface 602 is configured to accept training data and/or annotations of the training data. The annotations may include marks (e.g., indicators, etc.) identifying the discourse elements of the training data. The annotations may further include marks identifying various other discourse categories, such as "irrelevant", "incomprehensible", and the like. "Irrelevant" may be used to identify a text segment that does not contribute in a meaningful way. "Incomprehensible" may be used to identify a text segment that is not understood by the annotator (e.g., incorrect syntax, incorrect word usage, etc.). While the annotations may be generated in a variety of manners, in an embodiment of the invention, the user interface 602 is configured to accept manual annotations of the training data from a trained judge (See FIG. 8). The training data may include essays and the like. Additionally, the user interface 602 is configured to forward the training data and/or the manual annotations to the feature extractor 604 and receive the model 320 from the machine learning tool 618.

The feature extractor 604 of the model builder 600 is similar to the feature extractor 302 described hereinabove and thus only those features which are reasonably necessary for a complete understanding of the feature extractor 604 are described hereinbelow. One difference between the feature extractor 604 and the feature extractor 302 is that the feature extractor 604 is configured to receive, process, and/or forward data associated with the manual annotations. In this regard, following extraction of features, generation of a flat file, and generation of an RST, the feature extractor 604 is configured to forward data associated with the manual annotations and/or the flat file to the machine learning tool 618.

The machine learning tool 618 is configured to receive the manual annotation data and/or the flat file from the feature extractor 604 and generate the model 320 based on this data. In general, the machine learning tool 618 is configured to determine patterns associated with each annotation. For example, the conclusion statement may be strongly correlated with positional data (e.g., a conclusion statement is typically at, or near, the end of an essay). In an embodiment of the invention, a machine learning tool (e.g., a data mining tool, etc.), C5.0™ (Available from RULEQUEST RESEARCH PTY. LTD., AUSTRALIA), is utilized to generate the model 320. However, in other embodiments of the invention, various other machine learning tools, and the like, may be utilized to generate the model 320 and are thus within the scope of the invention. In this regard, in another embodiment of the invention, a plurality of models may be generated and incorporated into the model 320. For example, a model based on positional data, a model based on lexical features, a model based on key features, and another model based punctuations may be generated. These substantially independent models may be incorporated into the model 320. In this manner, a voting algorithm may receive categorized sentences from each model and determine a consensus for each categorized sentence. The machine learning tool 618 is further configured to forward data associated with the categorized sentences to the user interface 602.

In another embodiment, the model builder 600 may be configured to intercommunicate with a database such as the database 160. In this regard, the model builder 600 may be configured to execute autonomously and/or provide the user with the capability to select data from the database 160 for discourse analysis model building.

FIG. 7 is a flow diagram of a method 700 for building the model 320 according to an embodiment of the invention. While not shown in FIGS. 1 and 2, the method 700 may be implemented on a computer system (e.g., the computer system 200) and/or over a computer network (e.g., the computer network 100). As shown in FIG. 7, the method 700 is initiated in response to receiving at least one annotated essay (e.g., annotated training data). The annotated essay may be generated in a variety of manners (See FIG. 8) and thus, any reasonable method of generating annotated essays is within the scope of the invention. In an embodiment of the invention, the annotated essays may be in the form of a plurality of essays discussing one or more topics. The plurality of essays having been annotated by trained judges (See FIG. 8). In general, the annotations may be utilized to identify discourse-relevant features (e.g., discourse elements, cues, etc.).

At step 702, in response to receiving the at least one annotated essay, discourse-relevant features are extracted by the feature extractor 604. For example, in a manner similar to step 402-412, sentences may be identified, a flat file may be generated for the at least one essay, features and punctuations may be identified and appropriate modifications may be made to the flat file.

At step 704, in response to receiving the at least one annotated essay and/or the flat file, some or all of this information is examined for patterns by the machine learning tool 618. In addition, these patterns are utilized to build the model 320.

At step 706, the model 320, may be evaluated. For example, the model 320 may be utilized in a method similar to the method 300 to annotate an essay. The essay may be annotated by an expert and/or judge (See FIG. 8) and a comparison of the annotations may be performed. If the annotations agree within a predetermined range, the model 320 may pass the evaluation and the model 320 may be forwarded to the ADAA 180. If the annotations fail to agree within a predetermined range, the model 320 may fail the evaluation and the method 700 may return to step 702.

Figure 8:
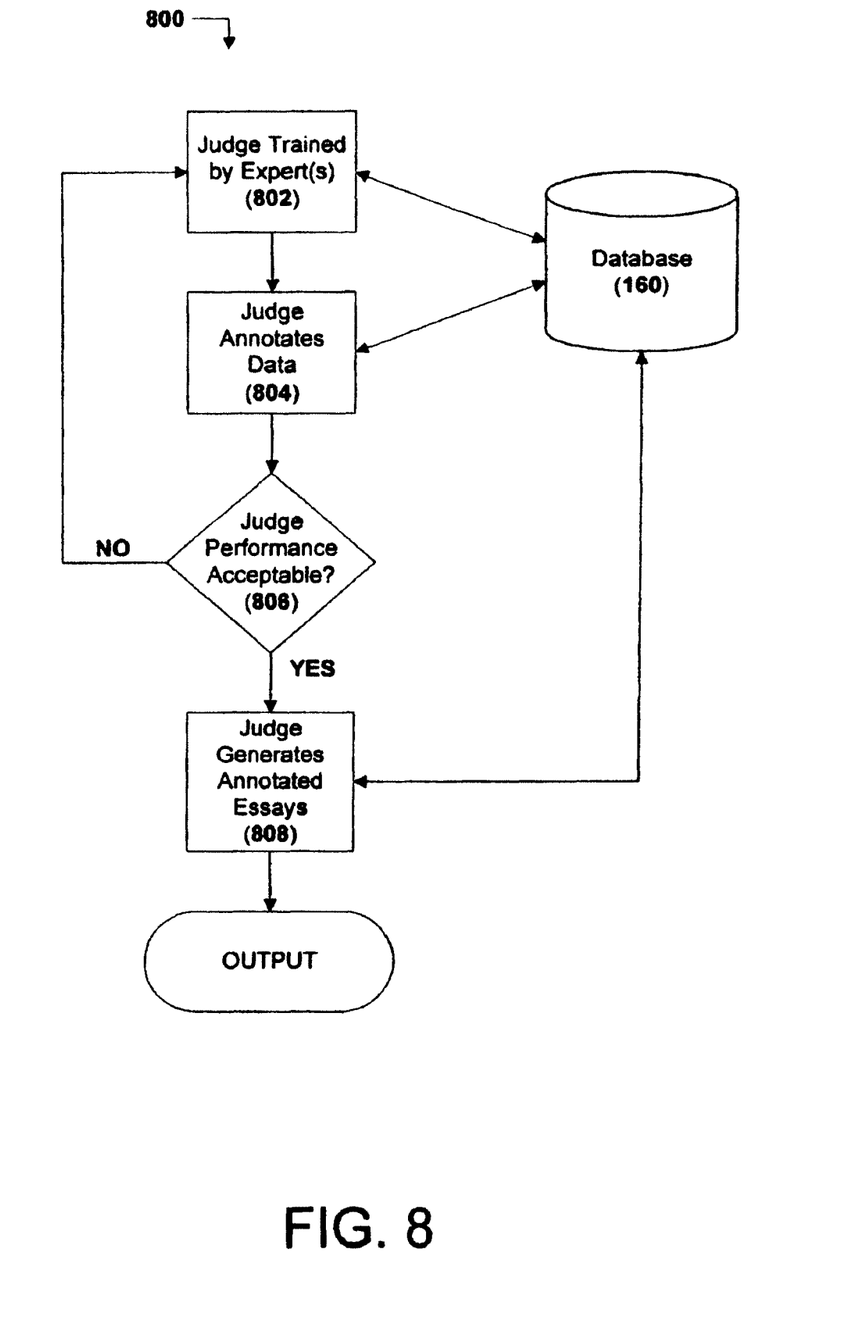
FIG. 8 is a flow diagram of a method for generating annotated data according to an embodiment of the invention.

FIG. 8 is a flow diagram of a method 800 for generating annotated essays according to an embodiment of the invention. As shown in FIG. 8, the method 800 is initiated in response to an expert and a judge receiving at least one essay from the database 160. The expert may be one or more persons generally recognized as having greater than average skill in the art of discourse analysis. The judge may be one or more persons of at least ordinary skill in the art of discourse analysis.

At step 802, the judge is trained by the expert. For example, the judge may observe the expert annotate one or more essays. The judge and expert may discuss how and why particular annotations are made, etc. In addition, while the essays are shown being received from the database 160, the essays may be received in any reasonable manner.

At step 804, data is annotated by the judge based on training received at step 802. For example, the judge may identify and mark (e.g., annotate) the thesis statement and conclusion in one or more essays. These annotations may be stored in the database 160.

At step 806, it is determined if the performance of the judge is acceptable. For example, annotated essays performed by a first judge may be compared to annotated essays of the same data by the experts and/or a second judge. A level of agreement between the annotated essays may be determined by calculating values for one or more of: Kappa, precision, recall and F-measure. In this regard, Kappa is a generally known equation for determining a statistical probability of agreement, excluding the probability of chance. Precision is a measure of agreement between the first judge and the second judge, divided by the number of annotations performed by the first judge. Recall is a measure of agreement between the first judge and the second judge, divided by the number of annotations performed by the second judge. F-measure is equal to two times precision times recall, divided by the sum of precision plus recall.

If the performance of the judge is determined to be unacceptable, the judge may receive more training at step 802. If the performance of the judge is determined to be acceptable, the judge may generate annotated essays at step 808.

At step 808, annotated essays may be generated by the judge. For example, the judge may receive essays from the database 160 and annotate the essays. These annotated essays may be forwarded to the ADAA 180 and/or the annotated essays may be stored to the database 160.

Additionally, while in an embodiment of the invention it may be practical for the expert to train one or more judges. For example, if a relatively large number of essays are to be annotated and doing so would be unduly burdensome to a relatively small number of experts, it may be advantageous to train a plurality of judges. In another embodiment of the invention, it may be more practical for the expert to act in the capacity of the judge or vise versa. For example, if there are a relatively low number of essays and the expert is capable of annotating them in an expedient manner or a plurality of relatively skilled judges, requiring little or no training, may be located. Therefore, while judges and experts are discussed herein, it is within the scope of the invention utilize one or the other and thus, steps 802-806 may be optional.

Furthermore, although not shown in FIG. 8, the annotated essays may be generated in a variety of manners and thus, any reasonable method of generating annotated essays is within the scope of the invention. In an embodiment of the invention, the annotated essays may be in the form of a plurality of essays discussing one or more topics. The plurality of essays having been annotated by trained judges. In general, the annotations may be utilized to identify discourse-relevant features (e.g., discourse elements, cues, etc.).

The ADAA 180, the model builder 600 and the methods 400, 700 and 800 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Examples of computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

Additionally, some or all of the users of the methods 400, 700 and 800 may exist as software program(s). For example, some or all of the experts, judges, and users referred to herein may include software agents configured to generate essays, annotate essays, and/or teach judges to annotate essays. In this regard, the software agent(s) may exist in a variety of active and inactive forms.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

We claim:

1. A computer-implemented method for annotating an essay, comprising:
   identifying by a processing system a sentence of the essay;
   identifying by the processing system a plurality of features associated with said sentence;
   determining by the processing system a probability of said sentence being a discourse element by a statistical evaluation that includes mapping the plurality of features to a model, said model having been generated by a machine learning application trained based on at least one annotated essay, wherein said mapping comprises extracting a pattern from the sentence based on the plurality of features and based on the training of the machine learning application; and
   annotating by the processing system said essay based on said probability, wherein said discourse element is at least one of: a title, a background, a thesis statement, a main point, support, and conclusion.

2. The method of claim 1, comprising:
   identifying another sentence of the essay;
   determining another plurality of features associated with said sentence;
   determining a probability of the another sentence being another discourse element by mapping said another plurality of features to the model, wherein said another discourse element is at least one of: a title, and a conclusion.

3. The method of claim 1, further comprising:
   receiving the essay.

4. The method of claim 1, wherein the plurality of features includes a lexical feature.

5. The method of claim 4, wherein the lexical feature comprises at least one of:
   a category-specific cue, said category-specific cue being associated with a discourse element;
   a general vocabulary cue, said general vocabulary cue being associated with a discourse structure; and
   a key term, said key term being associated with a discourse relationship.

6. The method of claim 4, further comprising:
   generating a flat file for the essay, the flat file including an entry for the identified sentence.

7. The method of claim 6, wherein the entry for the identified sentence includes a string of features separated by commas.

8. The method of claim 6, further comprising:
   modifying said entry to include data associated with said lexical feature.

9. The method of claim 6, wherein the flat file is mapped to a plurality of models and the probability is determined based on a voting algorithm.

10. The method of claim 1, wherein the plurality of features includes a punctuation within the identified sentence.

11. The method of claim 10, further comprising:
   generating a flat file for the essay, the flat file including an entry for the identified sentence; and
   modifying said entry to include data associated with said punctuation.

12. The method of claim 1, wherein the plurality of features includes a rhetorical feature.

13. The method of claim 12, wherein said rhetorical feature comprises at least one of:
   a discourse structure, said discourse structure being associated with an elementary discourse unit;
   a rhetorical relation, said rhetorical relation describing a manner of association between a plurality of said discourse structures; and
   a status, said status comprising: a nucleus, said nucleus being associated with a relatively more important one of said plurality of discourse structures; and a satellite, said satellite being associated with a relatively less important one of said plurality of discourse structures.

14. The method of claim 12, further comprising:
   generating a flat file for the essay, the flat file including an entry for the identified sentence; and
   modifying said entry to include data associated with said rhetorical feature.

15. The method of claim 14, further comprising:
   generating a rhetorical structure tree based on said flat file; and
   identifying said rhetorical feature based on said rhetorical structure tree.

16. The method of claim 15, wherein said rhetorical structure tree is mapped to a plurality of models and said probability is determined based on a voting algorithm.

17. A system for annotating an essay, comprising:
   a data processor;

computer readable memory encoded with instructions which, when executed, cause the data processor to execute steps comprising:

identifying a sentence of the essay;

identifying a plurality of features associated with said sentence;

determining a probability of said sentence being a discourse element by a statistical evaluation that includes mapping the plurality of features to a model, said model having been generated by a machine learning application trained based on at least one annotated essay, wherein said mapping comprises extracting a pattern from the sentence based on the plurality of features and based on the training of the machine learning application; and annotating said essay based on said probability, wherein said discourse element is at least one of: a title, a background, a thesis statement, a main point, support and conclusion.

18. The system of claim 17, wherein the instructions, when executed, cause the data processor to execute steps comprising:

identifying another sentence of the essay;

determining another plurality of features associated with the another sentence; and determining a probability of the another sentence being another discourse element by mapping said another plurality of features to the model, wherein said another discourse element is at least one of: a title, and a conclusion.

19. The system of claim 17, wherein the instructions, when executed, cause the data processor to execute steps comprising:

receiving the essay.

20. The system of claim 17, wherein the plurality of features includes a lexical feature.

21. The system of claim 20, wherein the lexical feature comprises at least one of:

a category-specific cue, said category-specific cue being associated with a discourse element;

a general vocabulary cue, said general vocabulary cue being associated with a discourse structure; and a key term, said key term being associated with a discourse relationship.

22. The system of claim 20, wherein the instructions, when executed, cause the data processor to execute steps comprising:

generating a flat file for the essay, the flat file including an entry for the identified sentence.

23. The system of claim 22, wherein the entry for the identified sentence includes a string of features separated by commas.

24. The system of claim 22, wherein the instructions, when executed, cause the data processor to execute steps comprising:

modifying said entry to include data associated with said lexical feature.

25. The system of claim 22, wherein the flat file is mapped to a plurality of models and the probability is determined based on a voting algorithm.

26. The system of claim 17, wherein the plurality of features includes a punctuation within the identified sentence.

27. The system of claim 26, wherein the instructions, when executed, cause the data processor to execute steps comprising:

generating a flat file for the essay, the flat file including an entry for the identified sentence; and modifying said entry to include data associated with said punctuation.

28. The system of claim 17, wherein the plurality of features includes a rhetorical feature.

29. The system of claim 28, wherein said rhetorical feature comprises at least one of:

a discourse structure, said discourse structure being associated with an elementary discourse unit;

a rhetorical relation, said rhetorical relation describing a manner of association between a plurality of said discourse structures; and a status, said status comprising: a nucleus, said nucleus being associated with a relatively more important one of said plurality of discourse structures; and a satellite, said satellite being associated with a relatively less important one of said plurality of discourse structures.

30. The system of claim 28, wherein the instructions, when executed, cause the data processor to execute steps comprising:

generating a flat file for the essay, the flat file including an entry for the identified sentence; and modifying said entry to include data associated with said rhetorical feature.

31. The system of claim 30, wherein the instructions, when executed, cause the data processor to execute steps comprising:

generating a rhetorical structure tree based on said flat file; and identifying said rhetorical feature based on said rhetorical structure tree.

32. The system of claim 31, wherein said rhetorical structure tree is mapped to a plurality of models and said probability is determined based on a voting algorithm.

33. A non-transitory computer-readable storage medium for causing a computer system to execute processing for automatically annotating essays, the computer readable storage medium comprising computer executable instructions which, when executed, cause the computer system to execute steps comprising:

identifying a sentence of the essay;

determining a plurality of features associated with said sentence;

determining a probability of said sentence being a discourse element by a statistical evaluation that includes mapping the plurality of features to a model, said model having been generated by a machine learning application trained based on at least one annotated essay, wherein said mapping comprises extracting a pattern from the sentence based on the plurality of features and based on the training of the machine learning application, and wherein said discourse element is at least one of: a background, a thesis statement, a main point, and support; and annotating said essay based on said probability.

34. The computer-readable storage medium of claim 33, the computer executable instructions which, when executed, cause the computer system to:

identify another sentence of the essay;

determine another plurality of features associated with the another sentence; and determine a probability of the another sentence being another discourse element by mapping said another plurality of features to the model, wherein said another discourse element is at least one of: a title, and a conclusion.

35. The computer-readable storage medium of claim 33, wherein the instructions, when executed, cause the computer system to execute steps comprising:
receiving the essay.

36. The computer-readable storage medium of claim 33, wherein the plurality of features includes a lexical feature.

37. The computer-readable storage medium of claim 36, wherein the lexical feature comprises at least one of:
a category-specific cue, said category-specific cue being associated with a discourse element;
a general vocabulary cue, said general vocabulary cue being associated with a discourse structure; and
a key term, said key term being associated with a discourse relationship.

38. The computer-readable storage medium of claim 36, wherein the instructions, when executed, cause the computer system to execute steps comprising:
generating a flat file for the essay, the flat file including an entry for the identified sentence.

39. The computer-readable storage medium of claim 38, wherein the entry for the identified sentence includes a string of features separated by commas.

40. The computer-readable storage medium of claim 38, wherein the instructions, when executed, cause the computer system to execute steps comprising:
modifying said entry to include data associated with said lexical feature.

41. The computer-readable storage medium of claim 38, wherein the flat file is mapped to a plurality of models and the probability is determined based on a voting algorithm.

42. The computer-readable storage medium of claim 33, wherein the plurality of features includes a punctuation within the identified sentence.

43. The computer-readable storage medium of claim 42, wherein the instructions, when executed, cause the computer system to execute steps comprising:
generating a flat file for the essay, the flat file including an entry for the identified sentence; and
modifying said entry to include data associated with said punctuation.

44. The computer-readable storage medium of claim 33, wherein the plurality of features includes a rhetorical feature.

45. The computer-readable storage medium of claim 44, wherein said rhetorical feature comprises at least one of:
a discourse structure, said discourse structure being associated with an elementary discourse unit;
a rhetorical relation, said rhetorical relation describing a manner of association between a plurality of said discourse structures; and
a status, said status comprising: a nucleus, said nucleus being associated with a relatively more important one of said plurality of discourse structures; and a satellite, said satellite being associated with a relatively less important one of said plurality of discourse structures.

46. The computer-readable storage medium of claim 44, wherein the instructions, when executed, cause the computer system to execute steps comprising:
generating a flat file for the essay, the flat file including an entry for the identified sentence; and
modifying said entry to include data associated with said rhetorical feature.

47. The computer-readable storage medium of claim 46, wherein the instructions, when executed, cause the computer system to execute steps comprising:
generating a rhetorical structure tree based on said flat file; and
identifying said rhetorical feature based on said rhetorical structure tree.

48. The computer-readable storage medium of claim 47, wherein said rhetorical structure tree is mapped to a plurality of models and said probability is determined based on a voting algorithm.

* * * * *